United States Patent Office 2,826,586
Patented Mar. 11, 1958

2,826,586
PENTACHLOROPHENYLMERCAPTOPYRIDINE-N-OXIDES

Francis E. Cislak, Indianapolis, Ind., assignor to Reilly Tar & Chemical Corporation, Indianapolis, Ind., a corporation of Indiana No Drawing. Application April 18, 1957
Serial No. 653,538

6 Claims. (Cl. 260—294.8)

This invention relates to pentachlorophenylmercaptopyridine-N-oxides and to the process of making them. More particularly, it relates to pentachlorophenylmercaptopyridine-N-oxides having the general formula:

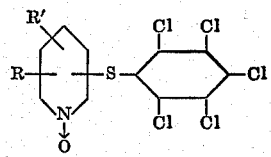

where R and R' are hydrogen, lower alkyl, hydroxy-lower alkyl, or benzyl.

In general the compounds of my invention may be prepared by the reaction of the corresponding halogenopyridine-N-oxide with an alkali or an alkaline earth metal salt of pentachlorobenzenethiol. The equation below portrays the preparation of 2-pentachlorophenylmercaptopyridine-N-oxide:

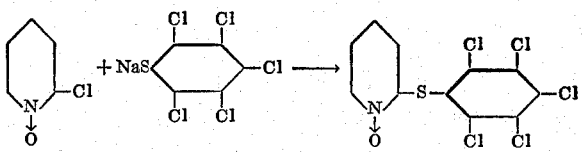

My invention will be described more fully in conjunction with the following specific examples. These examples are given by way of illustration only and are not intended as a limitation of my invention.

EXAMPLE 1
*2-pentachlorophenylmercaptopyridine-N-oxide*

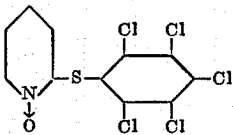

A solution of 65 grams of 2-chloropyridine-N-oxide in 300 cc. of water is placed into a two-liter flask equipped with a stirrer. The solution is heated to a temperature of about 70° C. and while stirring the solution there is added to it a solution of 150 grams of sodium pentachlorobenzenethiol in about 500 cc. of water. After all of the sodium pentachlorobenzenethiol solution has been added, the temperature of the reaction mixture is raised to about 85° C. and the stirring and heating continued for about one hour longer. Then the solution is cooled, acidified with 20% hydrochloric acid, and concentrated under vacuum. The residue consists of 2-pentachlorophenylmercaptopyridine - N - oxide, sodium chloride, and unreacted starting materials. The 2-pentachlorophenylmercaptopyridine-N-oxide is recovered from the residue in any convenient manner. One such convenient way is by recrystallization from 4-picoline.

EXAMPLE 2
*4-pentachlorophenylmercaptopyridine-N-oxide*

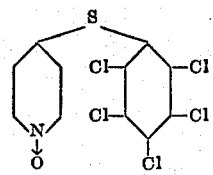

The procedure of Example 1 is repeated except that 4-chloropyridine-N-oxide is used in place of the 2-chloropyridine-N-oxide.

EXAMPLE 3
*2-pentachlorophenylmercapto-3-ethyl-6-methylpyridine-N-oxide*

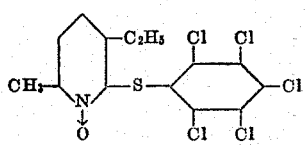

The procedure of Example 1 is repeated except that 2-chloro-3-ethyl-6-methylpyridine-N-oxide is used in place of the 2-chloropyridine-N-oxide.

EXAMPLE 4
*3-pentachlorophenylmercaptopyridine-N-oxide*

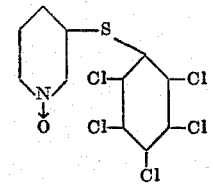

The procedure of Example 1 is repeated except that 3-bromopyridine-N-oxide is used in place of the 2-chloropyridine-N-oxide.

The compounds of my invention are useful as inhibitors for the pickling of steel with non-oxidizing acids. They are particularly useful pickling inhibitors when admixed with about 10% of ammonium thiocyanate.

The compounds of my invention are useful antibacterial and antifungal agents. They may be incorporated in rubber to prevent the rotting of the rubber.

I claim as my invention:

1. Pentachlorophenylmercaptopyridine-N-oxides having the general formula

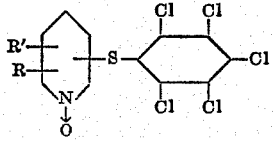

where R and R' are selected from the class consisting of hydrogen and lower alkyl.

2. 2-pentachlorophenylmercaptopyridine-N-oxide.
3. 3-pentachlorophenylmercaptopyridine-N-oxide.
4. 4-pentachlorophenylmercaptopyridine-N-oxide.
5. 2 - pentachlorophenylmercapto - 3 - ethyl-6-methyl-pyridine-N-oxide.
6. The process of preparing the compounds of claim 1 which comprises heating a halogenopyridine-N-oxide with an alkali metal salt of pentachlorobenzenethiol and recovering the resultant pentachlorophenylmercaptopyridine-N-oxide.

No references cited.